United States Patent Office 3,456,002
Patented July 15, 1969

3,456,002
OXIDATION OF ACROLEIN AND METHACRO-
LEIN WITH OXYGEN AND A VANADIUM
OXIDE-ANTIMONY OXIDE CATALYST
Isao Komuro and Kenichi Nagai, Tokyo, Japan, assignors to Mitsubishi Petrochemical Company Limited, Tokyo, Japan
No Drawing. Filed Oct. 30, 1964, Ser. No. 407,853
Claims priority, application Japan, Oct. 31, 1963, 38/57,664
Int. Cl. C07c *51/26;* B01j *11/34*
U.S. Cl. 260—530                                   7 Claims

ABSTRACT OF THE DISCLOSURE

A process wherein unsaturated aldehydes are contacted with molecular oxygen in the presence of a catalyst consisting of vanadium oxide and antimony oxide to selectively manufacture the corresponding unsaturated acids.

---

This invention relates to a catalyst composition for the catalytic oxidation of unsaturated aldehydes. More particularly, it relates to a catalyst composition for use in the oxidation of unsaturated aldehydes such as acrolein and methacrolein with molecular oxygen to produce corresponding unsaturated acids such as acrylic acid and methacrylic acid.

There has been proposed in the prior art of the oxidation of acrolein or methacrolein into acrylic acid or methacrylic acid, a catalyst composition comprising oxide of molybdenum, or combination thereof with oxides of bismuth, tungsten, nickel, vanadium, tin, antimony etc. Such known catalysts, however, have insufficient selectivity which results in the formation of considerable quantities of by-products other than desired products.

We, the inventors, have made an extensive investigation as to the catalyst adaptable for use in the oxidation of unsaturated aldehydes with molecular oxygen to the corresponding unsaturated acids, and now found that a catalyst comprising both oxide of vanadium and oxide of antimony exhibits excellent selectivity for the production of unsaturated acids.

Therefore, the new catalyst composition of the present invention is characterized by a combination of oxide of vanadium with oxide of antimony.

The proportion of vanadium to antimony in the catalyst composition has such influence that the greater antimony content gives rise to the increase in the selectivity to the unsaturated acids which becomes much more remarkable at the content of around 75 mol. percent or higher, while the conversion of unsaturated aldehyde becomes smaller as the antimony content increases.

A composition containing oxide of antimony alone does not only give low selectivity but also low conversion, and a composition containing oxide of vanadium alone gives low selectivity. It is therefore preferable in the catalyst system of this invention to use high antimony content in regard to both conversion and selectivity, and particularly preferable to use a content of 75–95 mol. percent and thereabout. Expressed as a molar ratio it would be 3:1–19:1.

The catalyst of this invention may be used together with a suitable carrier or support material with the increase in its activity and in the selectivity to the unsaturated acids.

Examples of such carriers include pumice, silica gel, alumina, calcined clay, Carborundum, titanium oxide, zirconium oxide etc. The use of pumice stone, silica gel and Carborundum is especially suited among others.

The catalyst of this invention may be prepared as follows.

An aqueous medium containing therein oxide of vanadium and oxide of antimony dissolved or suspended in water, or an aqueous solution containing salts which form such oxides by thermal decomposition, is admixed usually with carrier material and further combined, if desired, with a phosphorus compound or a boron compound, then drying at a temperature about 100° C., thereafter heating in the air until the above salt converts into oxide (usually 400–700° C.).

Examples of the salt of vanadium and antimony to be preferably employed in this invention are: ammonium metavanadate, vanadium chloride, antimony chloride, or vanadium and antimony or their oxide dissolved either in nitric acid or in hydrochloric acid.

The oxidation reaction of this invention is usually carried out in gaseous phase, but it is possible to carry out it in liquid phase as well.

The temperature of the oxidation reaction with the use of the catalyst of this invention is generally within the range of from 200 to 550° C., preferably 250 to 450° C.

The reaction of this invention may be carried out either in a fixed bed or fluidized bed type reactor.

The reaction is generally carried out under atmospheric pressure, but either elevated or reduced pressure may be employed.

It is advantageous to use as diluent, besides the reaction gas mixture comprising unsaturated aldehyde and molecular oxygen, such inert gases as nitrogen, argon, steam, carbon dioxide. Steam, in particular, is more favorable since it effectively inhibits complete oxidation and polymerization reaction often accompanied with exothermic reaction.

In addition, other oxidation inhibitors or polymerization inhibitors such as halogen, halogen-containing compounds, sulfur-containing compounds, oxygen-containing hydrocarbons such as quinone, phenol and the like, may be added in order to improve the reactivity (or conversion) of the unsaturated aldehyde as well as the selectivity to the unsaturated acid.

The optimum reaction condition may be determined from the suitable selection of such factors as reaction gas composition, flow rate, amount of catalyst, reaction temperature etc., and it must be set as to individual case because such conditions or factors are variable with the type of reactor and the activity of the catalyst to be employed.

The invention will be explained with further details but not limited by following examples.

Example 1

After changing antimony oxide to water-soluble form by adding a small amount of hydrochloric acid, ammonium metavanadate and three times moles (based on moles of added hydrochloric acid) of nitric acid were mixed thereto.

Furthermore a small amount of phosphoric acid and pumice carrier were mixed with above solution. A mixture was dried at 80–100° C. followed by heating in the air at 540° C. for 6 hours to obtain a catalyst.

Catalyst each containing either vanadium or antimony alone were separately prepared in a similar manner for comparison with the catalyst of this invention.

The pumice carrier used was prepared by grinding rough pumice stone into 5–9 mesh powder, treating with hot nitric acid for ten and several hours, then water-washing and drying. No remarkable difference was noticed as to the catalyst activity of pumice carriers depending upon the fact that whether it is treated with nitric acid or not.

Gas mixture composed of 47 vol. parts of steam, 47 vol. parts of air and 6 vol. parts of acrolein was passed through fixed bed type reaction tube at normal pressure and at reaction temperature of 350° C. with the contact time of 3–4 sec.

The analysis of the feed and the reaction product was made by gas chromatography.

The results were tabulated in Table 1.

TABLE 1

| Catalyst (atom ratio) | Conversion (percent) | Selectivity (mol. percent) | | |
|---|---|---|---|---|
| | | Acrylic acid | Acetic acid | Acetaldehyde |
| Sb:V=9:1 | 54.3 | 73.5 | 9.0 | |
| V | 22.0 | 11.1 | 17.5 | 54.5 |
| Sb | 6.8 | 12.5 | 33.0 | 45.5 |

The remaining reaction product other than acrylic acid, acetic acid, acetaldehyde consisted mainly of water and carbon dioxide.

As is evident from the Table 1, the catalyst of this invention is much better in the conversion and the selectively to the unsaturated acid than the catalyst containing either oxide of vanadium alone or oxide of antimony alone. Similar good results were obtained on applying the catalyst of this invention to the oxidation of methacrolein as well.

Example 2

Catalyst powder containing no pumice carrier was produced according to the similar manner described in Example 1.

Said powder was mixed with fine pumice powder smaller in size than that of 40 mesh and moulded in the form of tablet of 4 mm. high and of 6 mm. diameter.

The tablets were then calcined at 540° C. in the air for 6 hours and then used for catalyst.

The results of the oxidation of acrolein using the above-mentioned catalyst and carried out with the same reaction conditions except the reaction temperature were tabulated in Table 2.

TABLE 2

| Reaction temperature (° C.) | Conversion (mol. percent) | Selectivity (mol. percent) |
|---|---|---|
| 250 | 12 | 89 |
| 300 | 42 | 84 |
| 350 | 66 | 80 |

What we claim is:

1. A process for producing the unsaturated acids acrylic and methacrylic comprising oxidizing an unsaturated aldehyde in the presence of a catalyst consisting of an oxide of vanadium and an oxide of antimony with molecular oxygen, said antimony being present in the mole ratio of 19:1–3:1 to vanadium.

2. A process according to claim 1, wherein the reaction temperature is 200° C.–550° C.

3. A process according to claim 1, wherein the reaction temperature is 250° C.–450° C.

4. A process according to claim 1, wherein the catalyst is supported by a carrier.

5. A process according to claim 1, wherein the carrier is pumice, silica gel, alumina, calcined clay, Carborundum, titanium oxide or zirconium oxide.

6. A process according to claim 1, wherein the oxidation is carried out in the presence of a diluent selected from the group consisting of steam, nitrogen, argon and carbon dioxide.

7. A process according to claim 1, wherein the oxidation is carried out in the presence of a polymerization inhibitor selected from a halogen, halogen-containing compound, sulphur-containing compound or oxygen-containing compound selected from the group consisting of quinone and phenol.

References Cited

UNITED STATES PATENTS 3,065,264    11/1962    Koch et al. _____ 260—533

FOREIGN PATENTS 903,034    8/1962    Great Britain.

LORRAINE A. WEINBERGER, Primary Examiner

V. GARNER, Assistant Examiner